(12) United States Patent
Huang et al.

(10) Patent No.: US 11,401,391 B2
(45) Date of Patent: Aug. 2, 2022

(54) OYSTER PAPER AND MANUFACTURING METHOD THEREOF

(71) Applicant: DON JIA POLY PLASTIC LTD., New Taipei (TW)

(72) Inventors: Jui Lung Huang, New Taipei (TW); Chin Chih Huang, New Taipei (TW)

(73) Assignee: Don Jia Poly Plastic Ltd., New Taipei (TW)

( * ) Notice: Subject to any disclaimer, the term of this patent is extended or adjusted under 35 U.S.C. 154(b) by 371 days.

(21) Appl. No.: 16/518,264

(22) Filed: Jul. 22, 2019

(65) Prior Publication Data
US 2020/0024411 A1    Jan. 23, 2020

(30) Foreign Application Priority Data
Jul. 23, 2018 (TW) .................. 107125364

(51) Int. Cl.
*C08J 5/18* (2006.01)
*C08L 23/12* (2006.01)
(Continued)

(52) U.S. Cl.
CPC .............. *C08J 5/18* (2013.01); *B29B 7/90* (2013.01); *B29C 48/0018* (2019.02);
(Continued)

(58) Field of Classification Search
CPC ...... C08J 5/18; B29C 48/0018; B29C 48/022; C09C 1/021; D21H 3/825; D21H 13/34;
(Continued)

(56) References Cited

U.S. PATENT DOCUMENTS

| 5,919,574 A * | 7/1999 | Hoagland | B32B 9/02 |
| | | | 428/532 |
| 2002/0041060 A1* | 4/2002 | Liang | B29C 48/32 |
| | | | 264/564 |

(Continued)

FOREIGN PATENT DOCUMENTS

| TW | 201024501 A | 7/2010 |
| TW | 201418545 A | 5/2014 |
| TW | I507296 | 11/2015 |

OTHER PUBLICATIONS

Chong et al, "Fire-Retardant Plastic Material from Oyster-Shell Powder and Recycled Polyethylene", 2005, Wiley InterScience, pp. 1583-1589 (Year: 2005).*

*Primary Examiner* — Jasper Saberi
(74) *Attorney, Agent, or Firm* — Rosenberg, Klein & Lee

(57) ABSTRACT

An oyster paper and a manufacturing method thereof are provided. The oyster paper is made of 60%-70% oyster shell powder, 10%-20% polymer, 15%-17% natural biodegradation inducing agent, and 3%-5% natural biodegradation assisting additive agent, by volume ratio, which are subjected to mixing and pre-melting processing, followed by compounding and pelletizing to prepare oyster paper pellets, which are then subjected to film blowing processing to be film-blown into an oyster paper product having a thickness of 0.05-0.5 millimeters. The oyster paper possesses the quality of wood pulp paper and shows bettered stiffness and wider applications. The oyster paper also provides, after being disposed and buried, an effect of being 100% natural degradation into compost for fertilizing the soil. As such, a kind of oyster paper featuring recycling and reuse of oceanic creature waste shell and natural microorganism induced degradation for composting and recycling and a manufacturing method thereof are provided.

17 Claims, 9 Drawing Sheets

(51) Int. Cl.

| | |
|---|---|
| C08J 3/20 | (2006.01) |
| C09C 1/02 | (2006.01) |
| B29B 7/90 | (2006.01) |
| B29C 48/00 | (2019.01) |
| C08L 23/06 | (2006.01) |
| D21H 13/30 | (2006.01) |
| D21H 17/32 | (2006.01) |
| D21H 13/34 | (2006.01) |
| D21H 17/00 | (2006.01) |
| D21H 21/28 | (2006.01) |
| D21H 17/24 | (2006.01) |
| D21H 17/35 | (2006.01) |
| D21H 17/02 | (2006.01) |
| D21H 21/54 | (2006.01) |
| B29K 509/02 | (2006.01) |
| B29K 23/00 | (2006.01) |

(52) U.S. Cl.
CPC ............ *B29C 48/022* (2019.02); *C08J 3/203* (2013.01); *C08L 23/06* (2013.01); *C08L 23/12* (2013.01); *C09C 1/021* (2013.01); *D21H 3/825* (2013.01); *D21H 13/30* (2013.01); *D21H 13/34* (2013.01); *D21H 17/005* (2013.01); *D21H 17/02* (2013.01); *D21H 17/24* (2013.01); *D21H 17/32* (2013.01); *D21H 17/35* (2013.01); *D21H 21/54* (2013.01); *B29K 2023/00* (2013.01); *B29K 2509/02* (2013.01); *B29K 2995/006* (2013.01); *C01P 2004/61* (2013.01); *C08J 2323/06* (2013.01); *C08J 2323/12* (2013.01); *C08J 2405/08* (2013.01); *C08J 2489/00* (2013.01); *C08L 2201/06* (2013.01); *C08L 2203/16* (2013.01); *C08L 2666/26* (2013.01)

(58) Field of Classification Search
CPC ............ D21H 17/005; B29K 2995/006; C08L 2201/06; C08L 2203/16
See application file for complete search history.

(56) References Cited

U.S. PATENT DOCUMENTS

| | | | |
|---|---|---|---|
| 2011/0229698 A1* | 9/2011 | Rasmussen | C08L 5/12 156/267 |
| 2014/0272357 A1* | 9/2014 | He | C08L 23/0846 428/219 |
| 2015/0107488 A1* | 4/2015 | Dandenault | C08K 3/26 106/215.2 |
| 2017/0175146 A1* | 6/2017 | Iyer | B29C 48/022 |
| 2018/0186943 A1* | 7/2018 | Chateau | C08L 101/16 |

* cited by examiner

OYSTER PAPER AND MANUFACTURING METHOD THEREOF

BACKGROUND OF THE INVENTION

1. Field of the Invention

The present invention relates to oyster paper and a manufacturing method thereof, and in particular to oyster paper that is made of virgin wood pulp paper substitute materials and contains disposed oyster shells and natural biodegradation inducing agents, for replacing wood pulp paper and for natural degradation after disposal, and a method for manufacturing such oyster paper.

2. The Related Arts

Paper products made of wood pulp have wide uses and applications such as writing, printing, container making, and the like. The quantity of paper products that the entire world consumes every day is enormous, particularly for the large amount of advertisement printings, paper bags, and paper cases. Such wood pulp paper consists primarily of pulp made of chipped wood, and thus trees must be cut down in large numbers in order to make the wood pulp. This causes a great danger to the natural woods and rain forests, which are vastly cut down and disappear from maps, leading to an ecology crisis from the disappearance of the green world. Further, such a large quantity of paper and paper products generates a huge amount of trash after it has been used and disposed of. Dumping and covering with soil is a common way of handling such trash, yet this way does not allow the disposed paper and paper products to degrade naturally and fast, and a large area is needed for building dumping sites. This is not economic and may not efficiently use such areas. Incineration is another commonly used way for handling such used paper and paper products, yet this generates a large amount of carbon dioxide that pollutes the atmosphere, causing secondary contamination. This issue is a challenge to the modern production of paper and pulp-based articles.

Recycling and recovery of the used paper products to make recycled paper or recovered pulp is another way to handle the issue of used paper and paper products. However, the cost of making the recovered pulp through recycling of the used paper is quite high, and the process that is currently adopted to make the recovered pulp causes severe water contamination that is also an environmental pollution issue. In certain areas, such as China, Europe, and America, strict environmental protection regulations have been adapted to control such pollution issues and to reduce the number of pulp workshops and recovered pulp workshops. For such a trend, this solution of making recovered pulp will eventually be in vain, and provides no solution at all for handling the environment issues resulting from the large amount of disposed paper and paper products.

Further, prior art patent documents are known in this field, such as Taiwan Patent Publication Nos. 201024501 and 201418545, which propose mineral paper that is made of mineral powder, nanometer calcium carbonate, and non-toxic resin and plastics such as polyethylene, as a substitute of wood pulp paper. However, such mineral paper as taught in the two prior art patent documents still suffer from environment issues, such as the dumping of polyethylene, one of the ingredients of such mineral paper, which does not degrade biologically. In addition, a large amount of mineral powder and calcium carbonate is necessary for making such mineral paper, and large-scale mining would cause unexpected damage to the environment and ecology, making it not industrially useful.

Further, Taiwan Patent No. 1507296 proposes a green environment-friendly paper and a manufacturing method of such paper, in which plastic-based paper is made of ingredients including polymeric materials, inorganic materials, organic materials, and foaming agents as a substitute for wood pulp paper. However, in the prior art patent document, the inorganic materials comprise at least one mineral powder selected from calcium carbonate, kaolin clay, and titanium dioxide ($TiO_2$). The same manner of large-scale mining would be necessary, eventually causing damage to the environment and ecology, making it not industrially useful for similar reasons.

In addition, U.S. Pat. No. 5,919,574 discloses biodegradable laminated films fabricated from pectin and chitosan, which suffer from insufficient strength and stiffness and are not good as a substitute for wood pulp paper. Particularly, in such a prior art patent document, starch is added as an ingredient, which causes weakening of the film structure. Although such a prior art patent document teaches that a plasticizer, such as lactic acid, is added to improve stiffness thereof, the addition of lactic acid causes hazing of such a film product, thus making the film product unfit for applications as a substitute for wood pulp paper.

SUMMARY OF THE INVENTION

The known way of making paper with wood pulp and the techniques of the prior art patent documents all suffer certain shortcomings, such as massive logging and tree harvesting, water pollution in papermaking, large-scale mining and consumption of mineral resources in making mineral paper, destruction of natural ecology and environment conservation, incapability of natural degradation, and insufficient strength and stiffness and undesired hazing, all these making them not fit to applications as a substitute for wood pulp paper.

Thus, the primary objective of the present invention is to provide an oyster paper, which is made of 60%-70% oyster shell powder, 10%-20% polymer, 15%-17% natural biodegradation inducing agent, and 3%-5% natural biodegradation assisting additive agent, by volume ratio, that are subjected to mixing and pre-melting processing according to such ratios, followed by compounding and pelletizing to prepare a plurality of oyster paper pellets, the oyster paper pellets being subsequently subjected to film blowing processing through a film blowing operation to form an oyster paper having a thickness of 0.05 millimeters to 0.5 millimeters.

Further, in the above oyster paper according to the present invention, the oyster shell powder is calcinated at 600° C.-800° C. and sieved with a mesh number of 2000 to have a powder particle diameter less than 6.5 micrometers (μm).

In the above oyster paper according to the present invention, the polymer is selected as one of a member of a polyethylene group and polypropylene or a combination thereof.

In the above oyster paper according to the present invention, the polyethylene group for the polymer includes linear low-density polyethylene, high-density polyethylene, low-density polyethylene, and medium-density polyethylene.

In the above oyster paper according to the present invention, the natural biodegradation inducing agent is selected as chitosan.

In the above oyster paper according to the present invention, chitosan for the natural biodegradation inducing agent comprises a deacetylation product of chitin.

In the above oyster paper according to the present invention, the natural biodegradation assisting additive agent is selected as one of guar gum and a fruit and vegetable enzyme or a combination thereof.

In the above oyster paper according to the present invention, the fruit and vegetable enzyme for the natural biodegradation assisting additive agent is selected as one of soybean, okra, and pineapple or a combination of two thereof.

The present invention also provides a method for manufacturing oyster paper, which comprises the following steps:

(A) material mixing and pre-melting, in which ingredients, including 60%-70% oyster shell powder, 10%-20% polymer, 15%-17% natural biodegradation inducing agent, and 3%-5% natural biodegradation assisting additive agent, by volume ratio, are subjected to mixing according to such ratios and pre-melting;

(B) compounding and pelletizing for preparing oyster paper pellet, in which the ingredients that are subjected to mixing and pre-melting in Step (A) are subjected to compounding and pelletizing processing at a temperature of 110° C.-150° C. to prepare a plurality of oyster paper pellets;

(C) film blowing processing, in which the oyster paper pellets prepared in Step (B) are subjected to film blowing processing at a temperature of 110° C.-150° C.; and (D) oyster paper forming, in which an oyster paper having a thickness of 0.05 millimeters to 0.5 millimeters is formed after the film blowing processing of Step (C).

Further, in the above method for manufacturing oyster paper according to the present invention, in Step (A), the oyster shell powder is calcinated at 600° C.-800° C. and sieved with a mesh number of 2000 to have a powder particle diameter less than 6.5 micrometers.

In the above method for manufacturing oyster paper according to the present invention, in Step (A), the polymer is selected as one of a member of a polyethylene group and polypropylene or a combination thereof.

In the above method for manufacturing oyster paper according to the present invention, in Step (A), the polyethylene group for the polymer includes linear low-density polyethylene, high-density polyethylene, low-density polyethylene, and medium-density polyethylene.

In the above method for manufacturing oyster paper according to the present invention, in Step (A), the natural biodegradation inducing agent is selected as chitosan.

In the above method for manufacturing oyster paper according to the present invention, in Step (A), chitosan for the natural biodegradation inducing agent comprises a deacetylation product of chitin.

In the above method for manufacturing oyster paper according to the present invention, in Step (A), the natural biodegradation assisting additive agent is selected as one of guar gum and a fruit and vegetable enzyme or a combination thereof.

In the above method for manufacturing oyster paper according to the present invention, in Step (A), the fruit and vegetable enzyme for the natural biodegradation assisting additive agent is selected as one of soybean, okra, and pineapple or a combination of two thereof.

In the above method for manufacturing oyster paper according to the present invention, in Step (A), an operation of preparing the oyster shell powder comprises:

(A1) oyster shell cleaning, in which outside and inside of disposed oyster shells are subjected to cleaning processing;

(A2) desalting processing, in which the oyster shells that are subjected to cleaning processing in Step (A1) are subjected to desalting processing;

(A3) pulverizing processing, in which the oyster shells that are subjected to desalting processing in Step (A2) are deposited into a pulverizing machine to be pulverized into a plurality of oyster shell fragments;

(A4) calcinating and sterilizing processing, in which the oyster shell fragments that are formed through the pulverizing processing of Step (A3) are deposited into a high-temperature rotary calcination furnace to be subjected to calcinating and sterilizing processing at a temperature of 600° C.-800° C.;

(A5) grinding processing, in which the oyster shell fragments that are subjected to calcinating and sterilizing processing in Step (A4) are deposited into a grinding machine to be ground into oyster shell powder particles; and (A6) sieving and forming, in which the oyster shell powder particles that are formed through grinding in Step (A5) are subjected to sieving with a sieve of a mesh number 2000 to prepare an oyster shell powder product that is subjected to sieving with mesh number 2000 and has a powder particle diameter less than 6.5 micrometers.

In the above method for manufacturing oyster paper according to the present invention, in Step (B), the compounding and pelletizing processing is carried out with an intensive plastic mixer.

In the above method for manufacturing oyster paper according to the present invention, in Step (B), the compounding and pelletizing processing is carried out with a screw compounder.

In the above method for manufacturing oyster paper according to the present invention, in Step (C), the film blowing processing of the oyster paper pellets is carried out with a single-layer or multi-layer co-extrusion film blowing machine.

The oyster paper according to the present invention and the manufacturing method thereof provides the efficacies that disposed oyster shells are used as a major ingredient and are subjected to mixing, pre-melting, compounding, pelletizing, and film blowing processing in combination with a polymer, a natural biodegradation inducing agent, and a natural biodegradation assisting additive agent to achieve resources for recycling and reuse and to provide toughness similar to paper products made of wood pulp, the paper being suitable to be widely used in various applications, including paper bags for fast food, shopping bags, advertisement boards, posters, civil and industrial packaging paper, envelopes, and printings. Further, the oyster paper according to the present invention provides features of waterproofness and being free of toxicity, and could be recycled and reused as secondary recycling materials to thereby completely eliminate the shortcomings of the known way of making paper with wood pulp and the techniques of the above-discussed prior art patent documents, such as massive logging and tree harvesting and large-scale mining that causes destruction and pollution of the environment. It is particularly noted that the oyster paper according to the present invention, after being disposed and buried in soil, features direct induction of biodegradation with microorganisms present in the soil, and the completely degraded ingredient of oyster shell powder that contains rich organic calcium carbonate can serve as natural composting that fertilizes the soil to thereby achieve sustainable use in multiple aspects of green environmental protections. Further, the major ingredient of the present invention is oyster shell, which helps resolves the issues of environmental pollution and sanitary damage caused by accumulation of disposed oyster shells, thus further improving industrial use and economic effectiveness of the present invention.

DETAILED DESCRIPTION OF THE PREFERRED EMBODIMENTS

The present invention provides an oyster paper, which is made by first having 60%-70% oyster shell powder, 10%-20% polymer, 15%-17% natural biodegradation inducing agent, and 3%-5% natural biodegradation assisting additive agent, by volume ratio, subjected to mixing and pre-melting processing, followed by compounding and pelletizing to initially prepare a plurality of oyster paper pellets, and subsequently having such oyster paper pellets subjected to film blowing processing through a film blowing operation to form an oyster paper product having a thickness of 0.05 millimeters to 0.5 millimeters.

The above-mentioned oyster shell powder has been calcinated at 600° C.-800° C. and has been sieved with a mesh number of 2000 to have a powder particle diameter less than 6.5 micrometers; and the above-mentioned polymer is selected as one of a member of a polyethylene group and polypropylene or a combination thereof, wherein the polyethylene group for the polymer includes linear low-density polyethylene, high-density polyethylene, low-density polyethylene, and medium-density polyethylene.

The above-mentioned natural biodegradation inducing agent is selected as chitosan, wherein chitosan for the natural biodegradation inducing agent is a deacetylation product of chitin, which is a natural high-molecule polymer.

The above-mentioned natural biodegradation assisting additive agent is selected as one of guar gum and a fruit and vegetable enzyme or a combination thereof, and the fruit and vegetable enzyme for the natural biodegradation assisting additive agent is selected as one of soybean, okra, and pineapple or a combination of two thereof, wherein guar gum and fruit and vegetable enzyme are both natural biodegradation agents, which can assist the above-mentioned natural biodegradation inducing agent to accelerate speed and efficiency of biodegradation carried out by microorganisms in soil.

Figure 1:
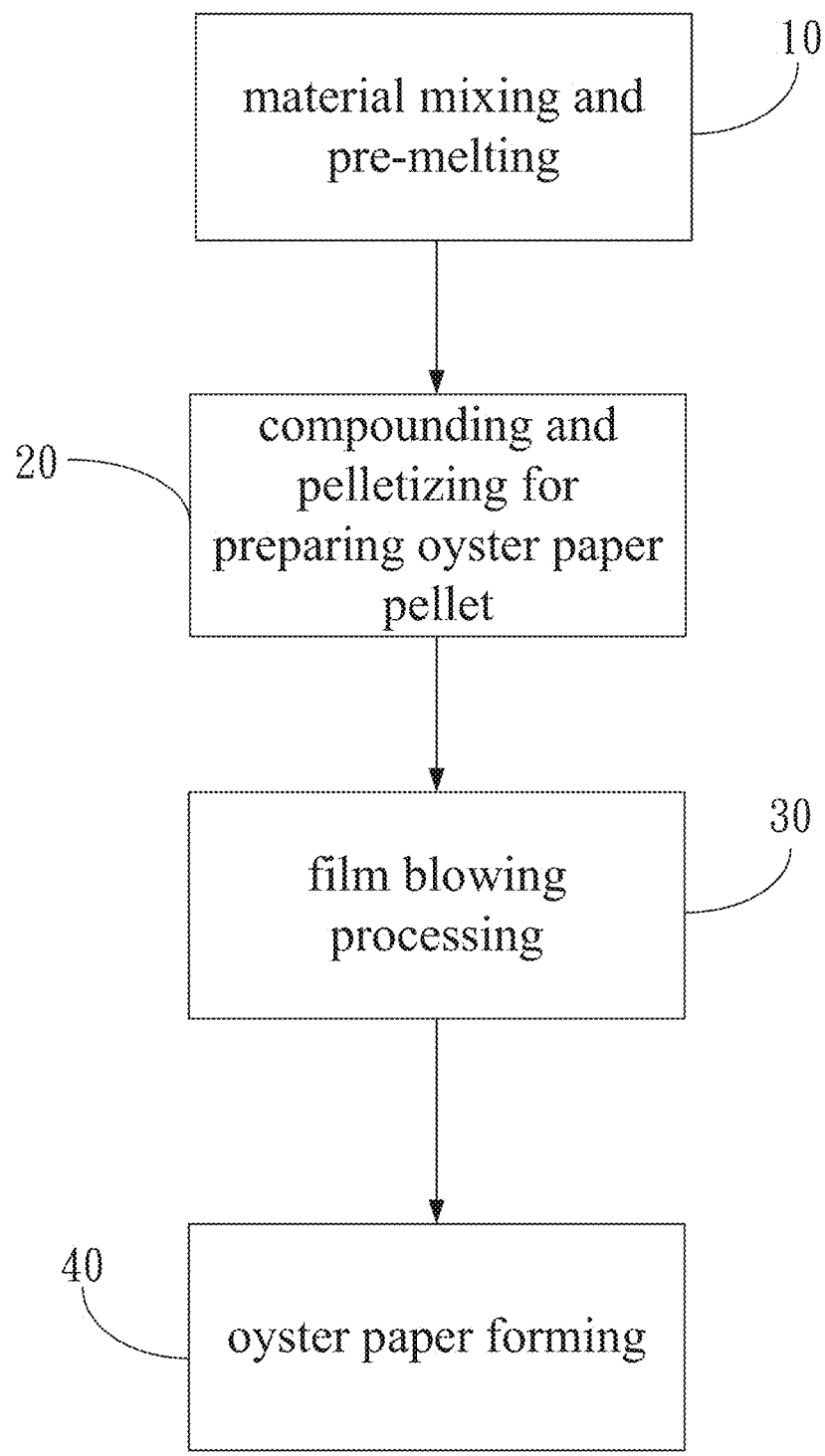
FIG. 1 is a flow chart showing a method for manufacturing oyster paper according to the present invention.
Figure 2:
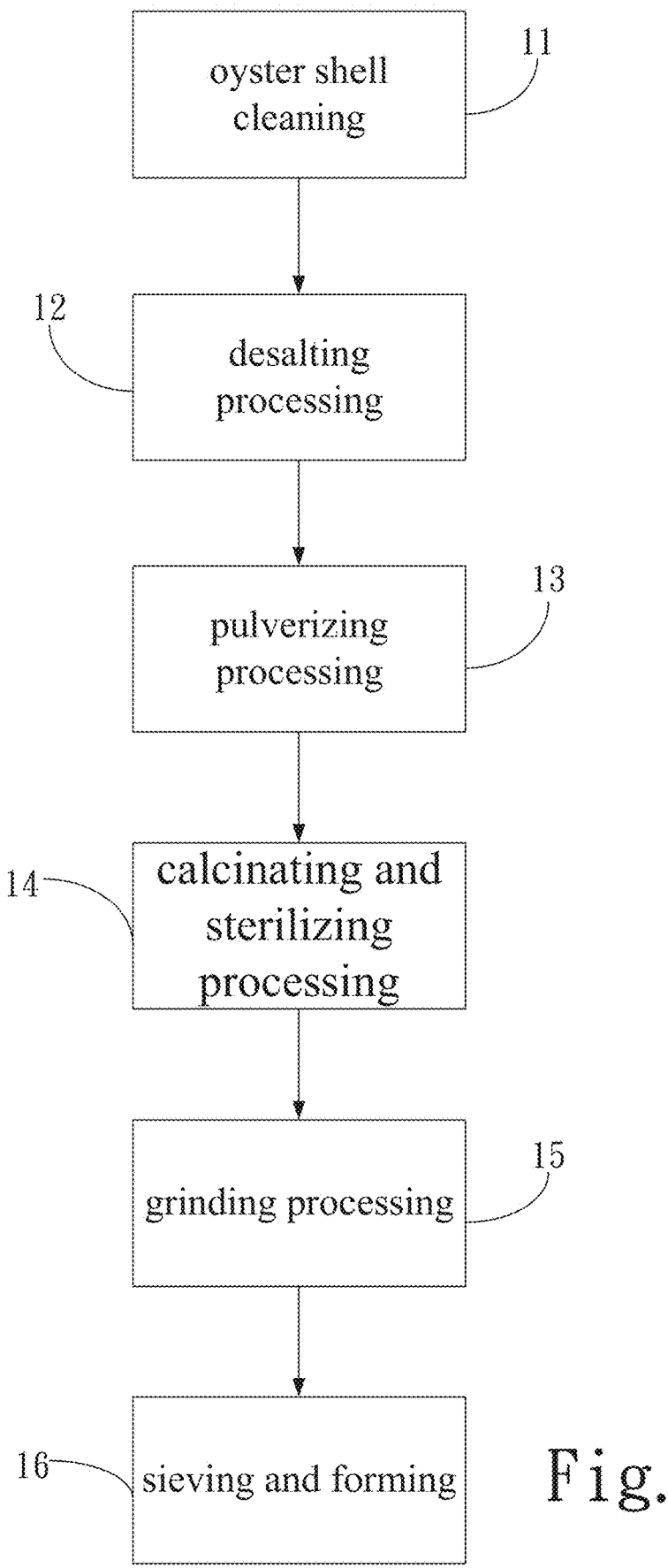
FIG. 2 is a flow chart showing a process of preparing oyster shell powder employed in the method for manufacturing oyster paper according to the present invention.

Referring to FIG. 1, a flow chart of a method for manufacturing oyster paper according to the present invention is shown. The method for manufacturing oyster paper comprises Steps 10-40, wherein:

(10) material mixing and pre-melting, in which 60%-70% oyster shell powder, 10%-20% polymer, 15%-17% natural biodegradation inducing agent, and 3%-5% natural biodegradation assisting additive agent, by volume ratio, are subjected to mixing according to such ratios and pre-melting;

(20) compounding and pelletizing for preparing oyster paper pellet, in which raw materials that have been subjected to mixing and pre-melting in Step (10) are deposited into an intensive plastic mixer or a screw compounder to be subjected to compounding and pelletizing processing at a temperature of 110° C.-150° C. to prepare a plurality of oyster paper pellets;

(30) film blowing processing, in which the oyster paper pellets prepared in Step (20) are subjected to film blowing processing at a temperature of 110° C.-150° C. with a single-layer or multi-layer co-extrusion film blowing machine; and

(40) oyster paper forming, in which a finished oyster paper product having a thickness of 0.05 millimeters to 0.5 millimeters is formed after the film blowing processing of Step (30).

In the method for manufacturing oyster paper according to the present invention illustrated in FIG. 1, the operation of preparing the oyster shell powder in Step (10) comprises Step 11-16, namely:

(11) an oyster shell cleaning, in which the outside and inside of disposed oyster shells are subjected to cleaning;

(12) a desalting processing, in which the oyster shells that are subjected to the cleaning in Step (11) are subjected to desalting;

(13) a pulverizing processing, in which the oyster shells that are subjected to the desalting in Step (12) are deposited into a pulverizing machine to be pulverized into a plurality of oyster shell fragments;

(14) a calcinating and sterilizing processing, in which the oyster shell fragments that are formed through the pulverizing processing of Step (13) are deposited into a high-temperature rotary calcination furnace to be subjected to calcinating and sterilizing at a temperature of 600° C.-800° C.;

(15) a grinding processing, in which the oyster shell fragments that are subjected to the calcinating and sterilizing in Step (14) are deposited into a grinding machine to be ground into oyster shell powder particles; and

(16) a sieving and forming, in which the oyster shell powder particles that are formed through grinding in Step (15) are subjected to sieving with a sieve of a mesh number 2000 to prepare an oyster shell powder product that has a powder particle diameter less than 6.5 micrometers.

Figure 3:
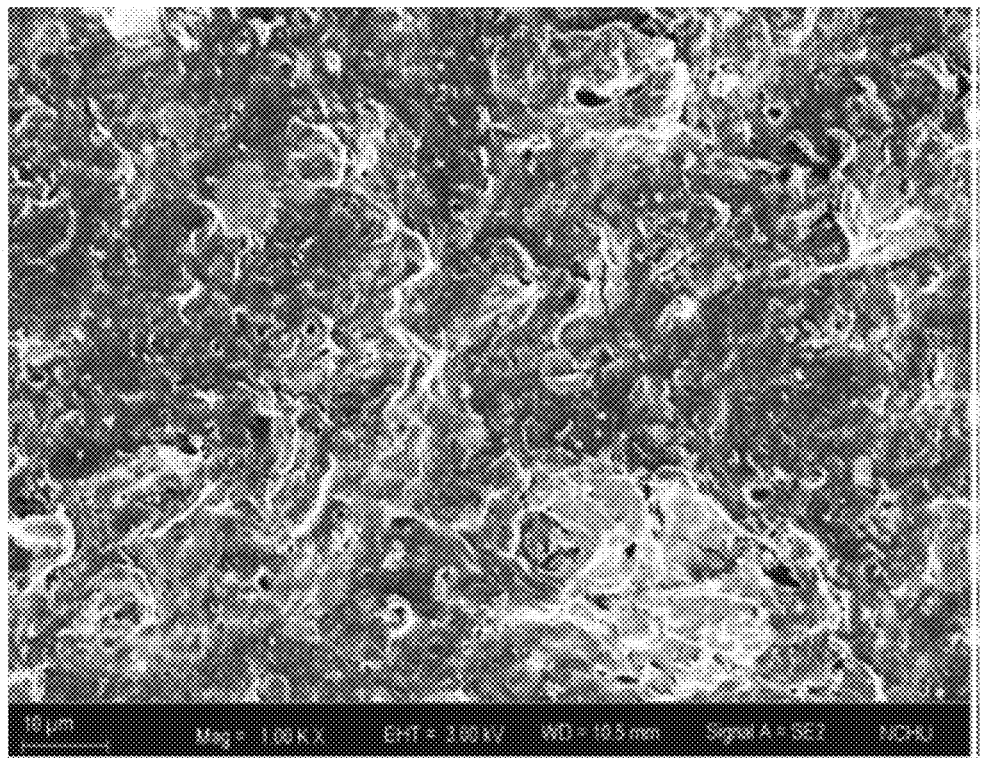
FIG. 3 is a picture, taken with a microscope, showing a surface of the oyster paper according to the present invention.
Figure 4:
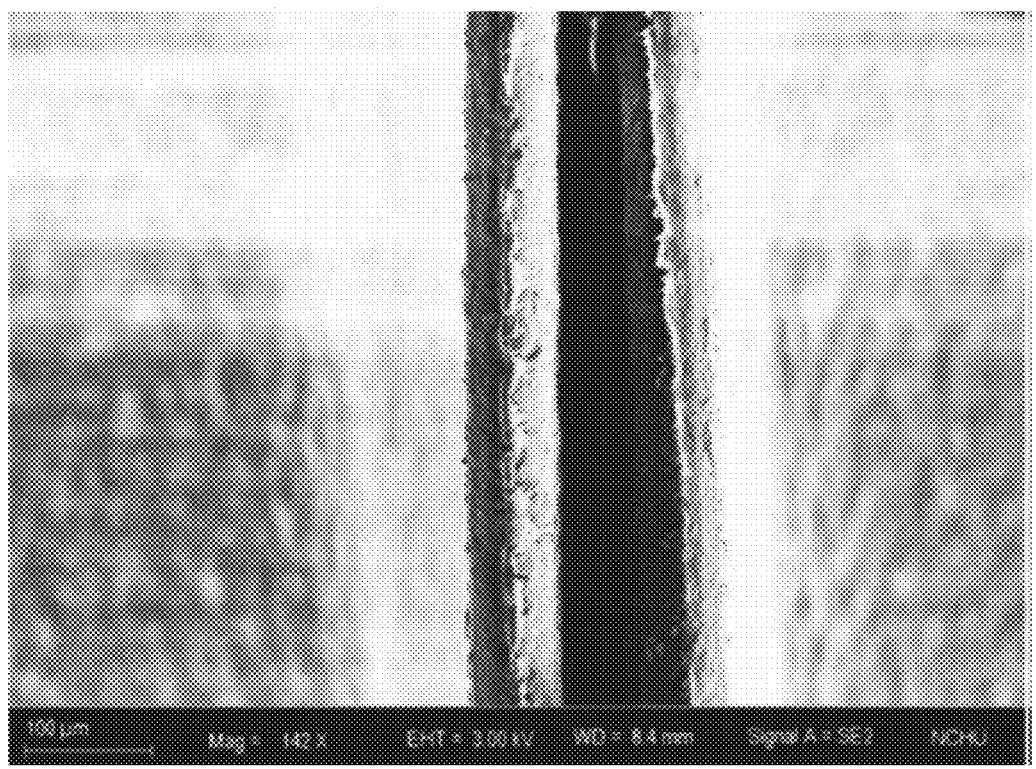
FIG. 4 is a picture, taken with a microscope, showing a cross-section of the oyster paper according to the present invention.

Referring to FIGS. 3 and 4, the oyster paper product that is prepared with Steps 10-40 of the method for manufacturing oyster paper according to the present invention illustrated in FIG. 1 can be clearly observed with a microscope, wherein pictures of a surface and a cross-section of the oyster paper product, which are enlarged by 100 times, show a cloud-like structure on the surface and the cross-section of the oyster paper product according to the present invention, illustrating that the oyster paper according to the present invention has a property of being much tougher than the conventional wood pulp paper products. In a test carried out for fracture strength, it is demonstrated that an oyster paper product having thicknesses of 0.1 millimeters and 0.05 millimeters, as compared to a conventional wood pulp paper product having a thickness of 0.1 millimeters, show that the oyster paper products according to the present invention have fracture strengths of 5.88 Kg/cm$^2$ and 6.11 Kg/cm$^2$, while the conventional wood pulp paper product shows a fracture strength of only 2.70 Kg/cm$^2$. Thus, the oyster paper according to the present invention, after being cut and bonded, could be widely used in various applications, including paper bags for fast food, shopping bags, advertisement boards, posters, civil and industrial packaging paper, envelopes, and printings.

Further, the oyster paper according to the present invention is also non-toxic. Tests (SGS Taiwan Limited of Test Report No. CE/2015/C4552) carried out for toxicity inspection of heavy metals, such as cadmium (Cd), plumbum (Pb), hydrargyrum (Hg), hexavalent chromium (Cr$^{6+}$), polybrominated biphenyl (PBBs), polybrominated diphenyl ethers (PBDEs), and halogens show results of no toxicity. Further, tests (Industrial Technology Research Institute of Test Report No. 10354C02920-1-1-01) have been carried out on the oyster paper according to the present invention for toxic gases of combustion show the oyster paper according to the present invention does not generate toxicant gases even under a combusted condition, and thus, the oyster paper according to the present invention is totally harmless to human body health and air quality, both in practical utilization or combination and incineration.

Figure 5:
FIG. 5 is a picture showing environmental biodegradation of the oyster paper according to the present invention in the environment.
Figure 6:
FIG. 6 is a picture showing 150-day environmental soil biodegradation of the oyster paper according to the present invention.
Figure 7:
FIG. 7 is a picture showing 300-day environmental soil biodegradation of the oyster paper according to the present invention.
Figure 8:
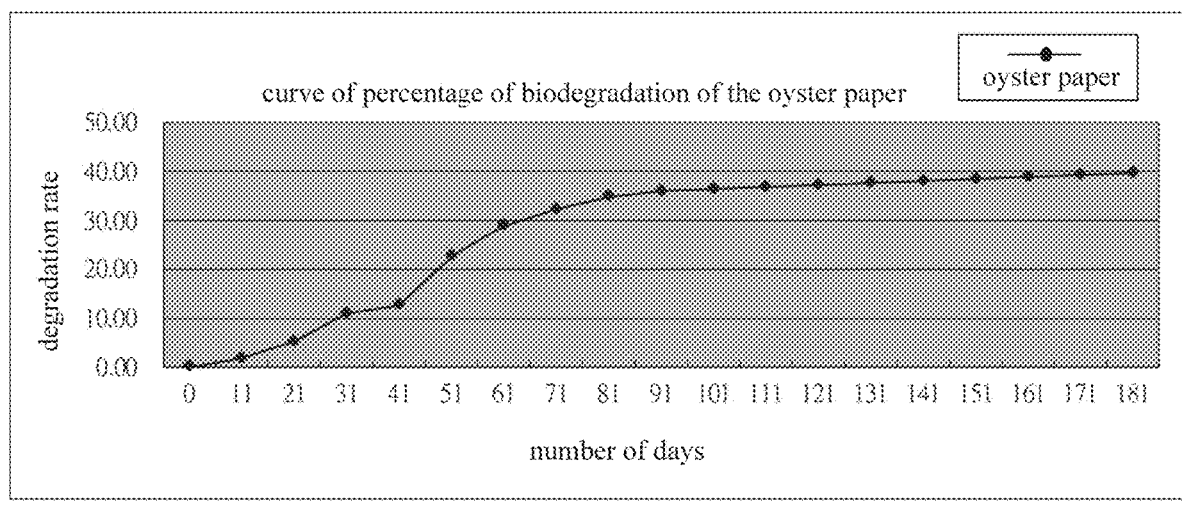
FIG. 8 is a plot showing a percentage curve of biodegradation of the oyster paper according to the present invention.
Figure 9:
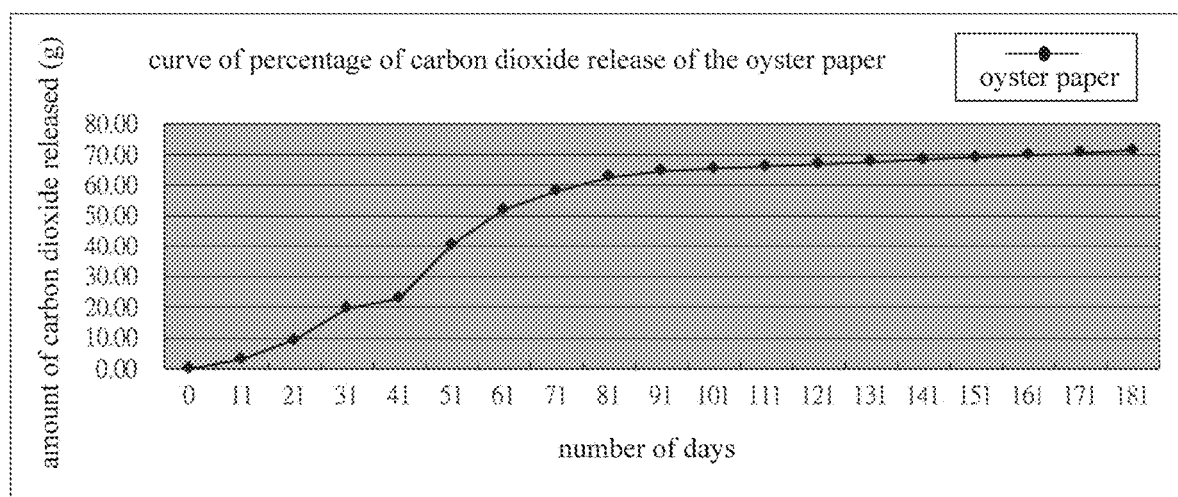
FIG. 9 is a plot showing a percentage curve of carbon dioxide release of the oyster paper according to the present invention.

Referring to FIGS. 5, 6, 7, 8, and 9, field degradation tests have been carried out on the oyster paper according to the present invention and additional laboratory tests based on HJ/T209-2005 and ASTMD5338-92 have also been carried out on oyster paper biodegradation, wherein FIGS. 5, 6, and 7 respectively show pictures of the field degradation test of the oyster paper according to the present invention at the beginning, the 150th day, and the 300th day. FIG. 7 shows, after degradation carried out for 300 days, the oyster paper according to the present invention reaches a degradation percentage as high as 90%. Further, FIG. 8 shows that, in the laboratory biodegradation test, the oyster paper according to the present invention, after degradation for 180 days, reaches a degradation rate as high as 39.9%, which helps ensure improvement of soil and the environment. FIG. 9 shows the amount of carbon dioxide released during the degradation of the oyster paper also provides acceleration of photosynthesis for plants grown in soil.

In the above-described oyster paper according to the present invention and the manufacturing method thereof, the description and drawings provided above are used as an illustrative explanation of the technical contents and solution adopted in the present invention, and the embodiments described are not intended to impose undue limitations to the scope of the present invention. All the equivalent modifications and variations of the structure details or components of the present invention are believed falling in the spirit and scope of the inventiveness of the application, which are only defined by the claims appended below.

What is claimed is:

1. An oyster paper, which is made of components including 60%-70% oyster shell powder, 10%-20% polymer, 15%-17% natural biodegradation inducing agent, and 3%-5% natural biodegradation assisting additive agent, by volume ratio, that are subjected to mixing and pre-melting processing according to such ratios, followed by compounding and pelletizing to prepare a plurality of oyster paper pellets, the oyster paper pellets being subsequently subjected to film blowing processing through a film blowing operation to form an oyster paper having a thickness of 0.05 millimeters to 0.5 millimeters, wherein the oyster shell powder is calcinated at 600° C.-800° C. and sieved with a mesh number of 2000 to have a powder particle diameter less than 6.5 micrometers (μm), and the natural biodegradation assisting additive agent includes guar gum.

2. The oyster paper according to claim 1, wherein the polymer is selected as one of a member of a polyethylene group and polypropylene or a combination thereof.

3. The oyster paper according to claim 2, wherein the polyethylene group for the polymer includes linear low-density polyethylene, high-density polyethylene, low-density polyethylene, and medium-density polyethylene.

4. The oyster paper according to claim 1, wherein the natural biodegradation inducing agent is selected as chitosan.

5. The oyster paper according to claim 4, wherein chitosan for the natural biodegradation inducing agent comprises a deacetylation product of chitin.

6. The oyster paper according to claim 1, wherein the natural biodegradation assisting additive agent further includes at least one fruit and vegetable enzyme selected from the group consisting of soybean, okra, and pineapple.

7. An oyster paper, which is made of components including 60%-70% oyster shell powder, 10%-20% polymer, 15%-17% natural biodegradation inducing agent, and 3%-5% natural biodegradation assisting additive agent, by volume ratio, that are subjected to mixing and pre-melting processing according to such ratios, followed by compounding and pelletizing to prepare a plurality of oyster paper pellets, the oyster paper pellets being subsequently subjected to film blowing processing through a film blowing operation to form an oyster paper having a thickness of 0.05 millimeters to 0.5 millimeters, wherein the natural biodegradation assisting additive agent includes guar gum;
wherein the oyster shell powder is prepared by:
cleaning an outside and an inside of disposed oyster shells, thereby generating cleaned oyster shells;
subjecting the cleaned oyster shells to a desalting processing, thereby generating desalted oyster shells;
depositing the desalted oyster shells into a pulverizing machine to be pulverized into oyster shell fragments;
depositing the oyster shell fragments into a high-temperature rotary calcination furnace to be subjected to a calcinating and sterilizing processing at a temperature of 600° C.-800° C., thereby generating calcinated oyster shell fragments;
depositing the calcinated oyster shell fragments into a grinding machine to be ground into oyster shell powder particles; and
sieving the oyster shell powder particles with a sieve of a mesh number 2000 to prepare an oyster shell powder product that has a powder particle diameter less than 6.5 micrometers.

8. A method for manufacturing the oyster paper of claim 1, comprising the following steps:
(A) material mixing and pre-melting, in which ingredients, including 60%-70% oyster shell powder, 10%-20% polymer, 15%-17% natural biodegradation inducing agent, and 3%-5% natural biodegradation assisting additive agent, by volume ratio, are subjected to mixing according to such ratios and pre-melting, wherein the natural biodegradation assisting additive agent includes guar gum, and wherein the oyster shell powder is calcinated at 600° C.-800° C. and sieved with a mesh number of 2000 to have a powder particle diameter less than 6.5 micrometers (μm);

(B) compounding and pelletizing for preparing oyster paper pellet, in which the ingredients that are subjected to mixing and pre-melting in Step (A) are subjected to compounding and pelletizing processing at a temperature of 110° C.-150° C. to prepare a plurality of oyster paper pellets;

(C) film blowing processing, in which the oyster paper pellets prepared in Step (B) are subjected to film blowing processing at a temperature of 110° C.-150° C.; and (D) oyster paper forming, in which an oyster paper having a thickness of 0.05 millimeters to 0.5 millimeters is formed after the film blowing processing of Step (C).

9. The method for manufacturing oyster paper according to claim 8, wherein in Step (A), the polymer is selected as one of a member of a polyethylene group and polypropylene or a combination thereof.

10. The method for manufacturing oyster paper according to claim 9, wherein in Step (A), the polyethylene group for the polymer includes linear low-density polyethylene, high-density polyethylene, low-density polyethylene, and medium-density polyethylene.

11. The method for manufacturing oyster paper according to claim 8, wherein in Step (A), the natural biodegradation inducing agent is selected as chitosan.

12. The method for manufacturing oyster paper according to claim 11, wherein in Step (A), chitosan for the natural biodegradation inducing agent comprises a deacetylation product of chitin.

13. The method for manufacturing oyster paper according to claim 8, wherein in Step (A), the natural biodegradation assisting additive agent further includes at least one fruit and vegetable enzyme selected from the group consisting of soybean, okra, and pineapple.

14. The method for manufacturing oyster paper according to claim 8, wherein in Step (A), an operation of preparing the oyster shell powder comprises:

(A1) oyster shell cleaning, in which outside and inside of disposed oyster shells are subjected to cleaning processing;

(A2) desalting processing, in which the oyster shells that are subjected to cleaning processing in Step (A1) are subjected to desalting processing;

(A3) pulverizing processing, in which the oyster shells that are subjected to desalting processing in Step (A2) are deposited into a pulverizing machine to be pulverized into a plurality of oyster shell fragments;

(A4) calcinating and sterilizing processing, in which the oyster shell fragments that are formed through the pulverizing processing of Step (A3) are deposited into a high-temperature rotary calcination furnace to be subjected to calcinating and sterilizing processing at a temperature of 600° C.-800° C.;

(A5) grinding processing, in which the oyster shell fragments that are subjected to calcinating and sterilizing processing in Step (A4) are deposited into a grinding machine to be ground into oyster shell powder particles; and (A6) sieving and forming, in which the oyster shell powder particles that are formed through grinding in Step (A5) are subjected to sieving with a sieve of a mesh number 2000 to prepare an oyster shell powder product that is subjected to sieving with mesh number 2000 and has a powder particle diameter less than 6.5 micrometers.

15. The method for manufacturing oyster paper according to claim 8, wherein in Step (B), the compounding and pelletizing processing is carried out with an intensive plastic mixer.

16. The method for manufacturing oyster paper according to claim 8, wherein in Step (B), the compounding and pelletizing processing is carried out with a screw compounder.

17. The method for manufacturing oyster paper according to claim 8, wherein in Step (C), the film blowing processing of the oyster paper pellets is carried out with a single-layer or multi-layer co-extrusion film blowing machine.

* * * * *